United States Patent [19]
Dispenza

[11] Patent Number: 6,053,456
[45] Date of Patent: Apr. 25, 2000

[54] CABLE ANCHOR ASSEMBLY

[75] Inventor: John Anthony Dispenza, Long Valley, N.J.

[73] Assignee: Lucent Technologies Inc., Murray Hill, N.J.

[21] Appl. No.: 09/106,685

[22] Filed: Jun. 29, 1998

[51] Int. Cl.⁷ ...................................................... F16L 5/00
[52] U.S. Cl. ........................... 248/56; 248/68.1; 248/74.4
[58] Field of Search .......................... 248/56, 68.1, 74.4; 174/65 G, 153 G, 48, 151

[56] References Cited

U.S. PATENT DOCUMENTS

| | | | |
|---|---|---|---|
| 1,697,814 | 1/1929 | Forbes | 248/56 X |
| 2,404,531 | 7/1946 | Robertson | 248/68.1 |
| 2,937,835 | 5/1960 | Csmereka | 248/68.1 X |
| 3,489,440 | 1/1970 | Brattberg | 248/56 X |
| 3,518,359 | 6/1970 | Trimble et al. | 248/56 X |
| 3,531,071 | 9/1970 | Kubli | 248/68.1 |
| 4,442,990 | 4/1984 | Krueger | 248/68.1 X |
| 4,601,447 | 7/1986 | McFarland | 248/68.1 X |
| 4,677,253 | 6/1987 | Blomqvist . | |
| 4,733,016 | 3/1988 | Twist et al. . | |
| 4,767,086 | 8/1988 | Blomqvist . | |
| 5,545,854 | 8/1996 | Ishida | 248/56 X |

*Primary Examiner*—Derek J. Berger

[57] ABSTRACT

A cable anchor assembly for facilitating ready anchored connection of cables to components while protecting the cables from external forces and from moisture. The assembly includes a plurality of plates slidably engageable along a rail for facilitating relative movement between the plates. Each plate has an engaging edge that defines a portion of a formable collar in which a cable is receivable. A fixture, such as a rubber boot, is placed over a section of the cable and, with the plates separated, the cable section is placed between the formable collar portions, whereupon the plates are brought into sliding edge-to-edge contact with each other to enclose the cable section and boot. With the plates in contact, a securing mechanism is operated to maintain contact between the plates. In a preferred embodiment, the boot is configured to create a substantially water-resistant seal between the cable section and the movable plates.

11 Claims, 3 Drawing Sheets

CABLE ANCHOR ASSEMBLY

BACKGROUND OF THE INVENTION

I. Field of the Invention

The present invention relates to cable anchors and, more particularly to a cable anchor assembly for installing cables in electrical cabinets and enclosures typically located outdoors.

II. Description of Related Art

Cable anchors and rubber boots are generally well known in the art and are used to install cables and to lead cables through walls, cabinets, enclosures and like structures. One example of such a device is found in U.S. Pat. No. 4,767,086 (Blomqvist) which discloses a tightening device for a cable bushing arrangement. The device includes a rigid frame structure having packing pieces arranged in rows with the packing pieces having cable accommodating holes. A tightening device which includes a pressure plate is located between the frame structure and the adjacent rows of packing pieces, and a tightening element, such as a screw, is situated between the frame structure and the pressure plate to force the pressure plate against the rows of packing pieces when the screw is turned in an appropriate direction.

There are, however, problems inherent in this approach. For instance, the ends of the cables must be threaded or passed vertically through the holes. This is problematic, especially for large diameter cables which are difficult to manipulate. In addition, the screw assembly of the tightening element is an additional part necessary for installation, thereby yielding increased cost for tooling and assembly.

U.S. Pat. No. 4,733,016 (Twist et al.) discloses another example of a known cable anchor, in which a lead-through transit for cables or pipes includes a series of modular resilient blocks that are mounted in a frame through which the cables extend. The cables are secured to the block by applying a clamping force which is controlled by tightening a mechanism including a compression bolt, rods and studs. The requirement for these numerous parts, as in the Blomqvist device, results in increased manufacturing and installation costs.

SUMMARY OF THE INVENTION

A cable anchor assembly is provided for simplifying connection of cables to equipment in an enclosure while safeguarding against external force applied to the cables. The assembly includes a pair of plates that are slideably engageable within a groove formed in a support rail to allow the plates to be brought into contact with each other. Each plate has an opposing end having a collar portion defined therein so that when the plates are brought together, a collar is automatically formed. The collar is dimensioned for accommodating insertion of a cable. A securing device is also provided for locking the plates together to prevent unintended separation of the collar once a cable is placed therein.

In a preferred embodiment, sleeves or boots interface a cable section with a collar. The boots are slid over a cable and cover the cable section. The covered cable section, together with the boot, is placed within a collar whereupon the plates are moved together to secure the cable and boot within the collar. Each boot is formed with a lip or ridge that seats on a collar surface. The ridge serves as a weather seal and also counteracts against pulling or pushing force that may be applied to the cable.

Also in the preferred embodiment, fixed collars are formed on the plates through which boots are mounted for accommodating cables having various diameters.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
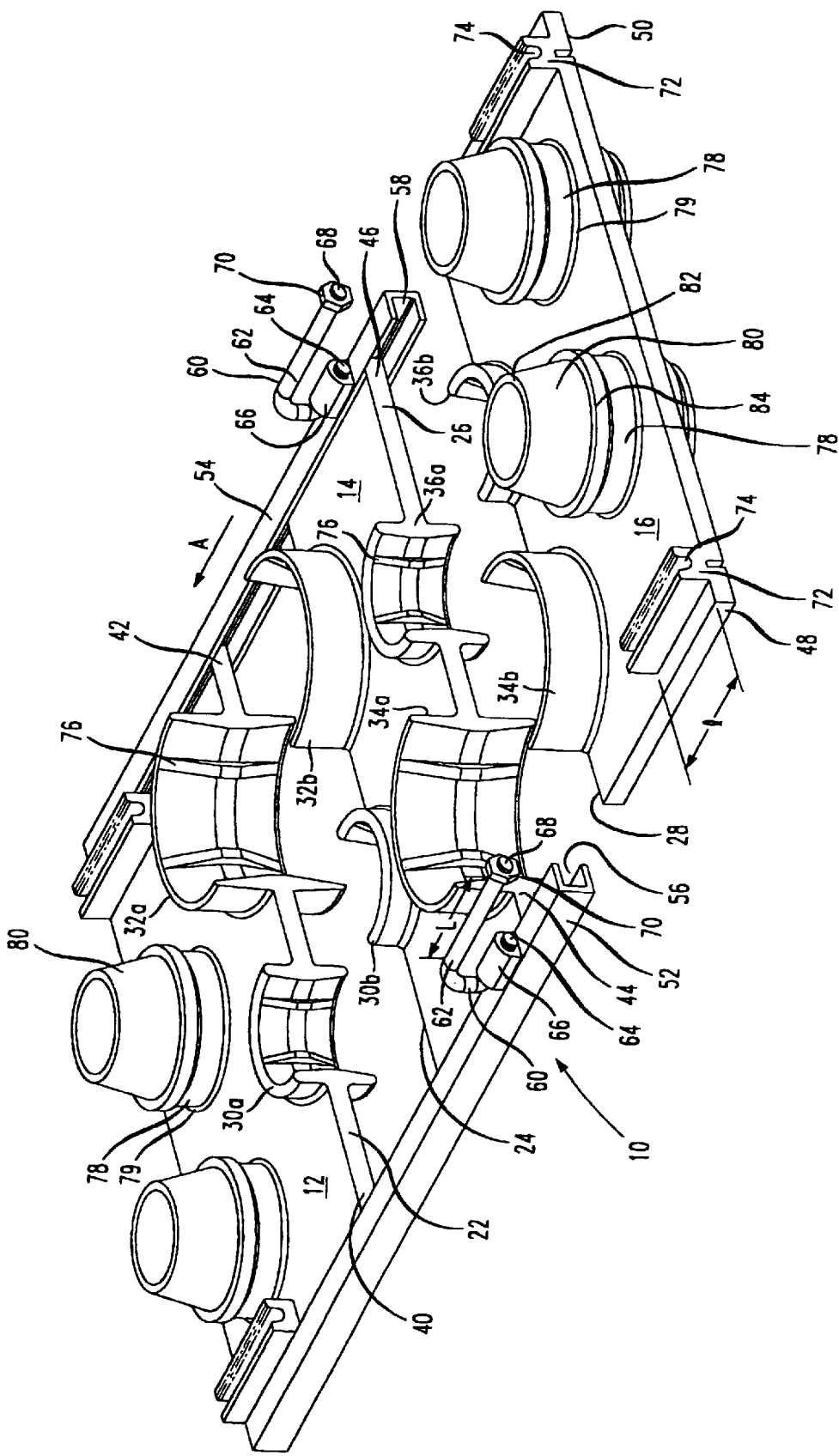
FIG. 1 is a perspective one embodiment of a cable anchor assembly in accordance with the present invention.

As shown in FIG. 1, a cable anchor assembly 10 in accordance with a preferred embodiment of the present invention includes a plurality of plates 12, 14 and 16. The plates are arranged, as shown, so that two of the plates (12 and 16) comprise end plates which abut and enclose a center plate (plate 14). Each plate has at least one engaging edge that engages an opposing engaging edge of an adjacent plate. For example, and as explained more fully below, plate 12 has an engaging edge 22 which is brought into contact with an engaging edge 24 of plate 14. Edge 28 of plate 16 is brought into contact with a second engaging edge 26 of plate 14. The plates may be constructed by molding them from any substantially rigid material, such for example as plastic, metal, etc. although, due to its weather durability, plastic is preferred.

Each engaging edge forms a portion of a formable collar for seating about a sleeve or a cable, and for accommodating cable passage through assembly 10 when the plates are moved to a closed position. Thus, edge 22 defines collar portions 30a and 32a which mate with respective collar portions 30b and 32b formed along edge 24. Likewise, collar portions 34a and 36a are formed in edge 26 and mate with respective collar portions 34b and 36b formed along edge 28. As will be appreciated, when plates 12, 14 and 16 are brought into contact with each other such that edge 22 engages edge 24 and edge 26 engages edge 28, collars 30, 32, 34 and 36 are fully formed for providing passages through assembly 10 for cables which connect electronic components, such as circuit boards contained in a housing, to various electronic devices.

With continued reference to FIG. 1, each plate 12, 14, 16 has a pair of substantially parallel securing edges such that plate 12 has edges 40, 42, plate 14 has edges 44, 46 and plate 16 has edges 48 and 50. A pair of substantially parallel, spaced apart rails 52, 54 are disposed about plates 12, 14 and 16 such that rail 52 is proximate edges 40, 44 and 48, and rail 54 is proximate edges 42, 46 and 50. Rails 52, 54 may be formed of any known rigid material, such as plastic or metal. As shown, each rail defines a guide or channel 56, 58 for accommodating insertion of the securing edges of plates 12, 14 and 16 and for providing slidable engagement of the plates within the guides 56, 58. A stop (not shown) formed at one end of the rails 52, 54 secures a leading edge of plate 12 within guides 56, 58 when plate 12 is inserted into the guides in accordance with the present invention.

In addition to collar portions which define the formable collars 30, 32, 34 and 36, some plates, for example plates 12 and 16 in FIG. 1, contain fixed collars 78 formed about openings 79 defined in and through the plates. The fixed collars will typically have smaller diameters than the formable collars 30, 32, 34 and 36 and, accordingly, will accommodate retained insertion of smaller diameter cables which are more flexible and have increased maneuverability over larger diameter cables. Thus, and as explained more fully below, smaller diameter cables are generally interfaced with plates 12 and 16 through openings 80, whereas larger diameter cables are secured to the plates through collars 30, 32, 34 and 36.

Figure 2:
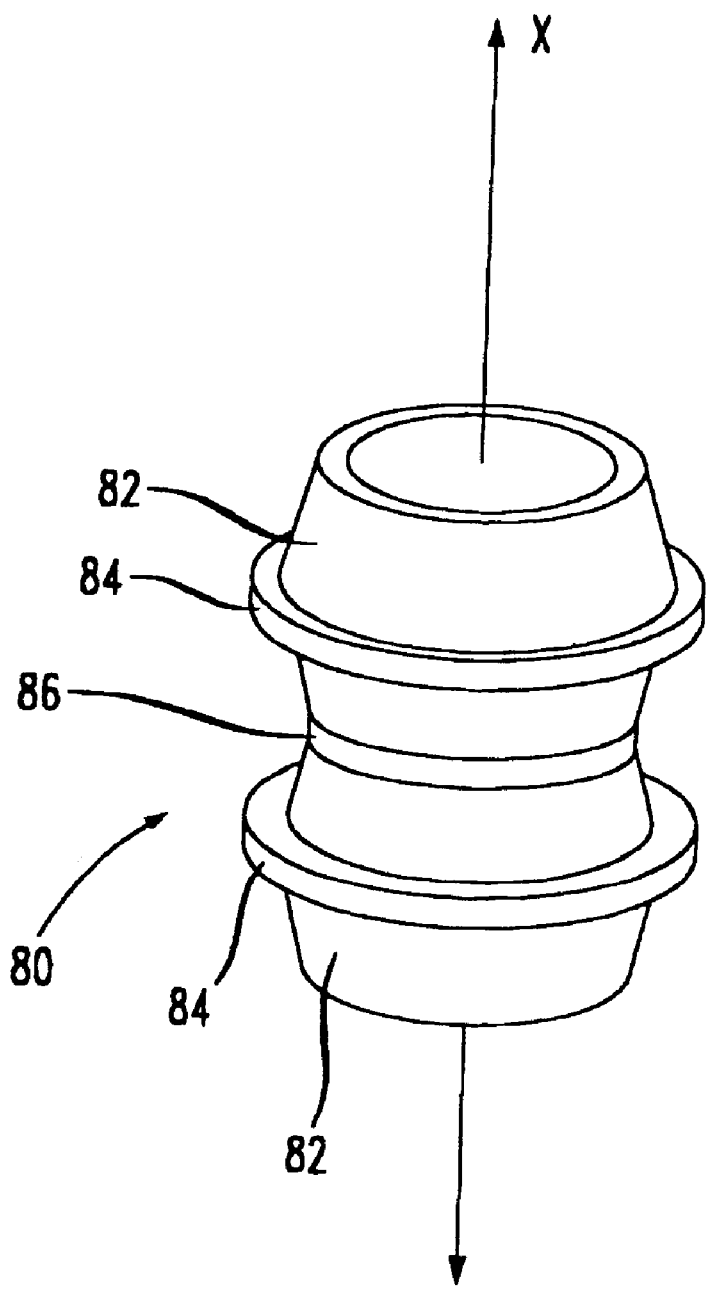
FIG. 2 is a side view of a boot that is used in conjunction with the plates of FIG. 1.

To interface cables with assembly 10, a boot 80 is utilized. A preferred embodiment of boot 80 is shown in FIG. 2 and includes continuous tapered sidewalls 82 which define an opening having a longitudinal axis "x" through which a cable is insertable. To couple numerous cables having varying diameters to plates 12, 14 and 16, numerous boots 80 will be used having varying diameters to accommodate the various cable sizes. The boots 80 are preferably constructed from a durable, weather resistant and flexible material, such as rubber. For mounting smaller diameter cables, which are somewhat more malleable, to plates 12 and 16 and, in particular, through collars 80 formed therein, boots 80 are first placed within openings 79 by, for example, compressing or collapsing the boot and pushing it through one of the openings 79. As shown in FIG. 2, each boot has a substantially hourglass shape defined by the continuous tapered sidewalls 82 positioned about a center portion 86. A pair of continuous ridges or lips 84 are provided so that when boot 80 is inserted into opening 79 in accordance with the present invention, center portion 86 is seated within the fixed collar 78 and each ridge rests on either side of the collar, as shown in FIG. 1, to create a weather seal. Thus, for example, an upper ridge 84 rests on an upper edge of fixed collar 78 disposed on a top surface of plate 16 and a lower ridge 84 rests on a lower surface of fixed collar 78 disposed on a bottom surface of plate 16.

With boots 80 so positioned in fixed collars 78, cables having appropriate diameter(s) may be fed through openings in the boots 80. It should be pointed out that the pair of ridges 84 provide a protection arrangement for guarding against the deleterious effects of pushing or pulling forces applied to a cable once installation is complete. For example, with boot 80 firmly in place, a pulling force applied to a cable will be counteracted by one of the ridges 84 engaging fixed collar 78, thus preventing boot 80 from being pulled or pushed through opening 79 when a cable is journaled therethrough. Moreover, the ridge 84 also provides weather protection by forming an effective weather seal between a cable and the collars.

As for larger diameter cables, such cables are often difficult to maneuver and, therefore, cannot be readily pushed or advanced through boots 80 that have already been disposed within openings 79. For such cables, the boot 80 is first placed about the cable by sliding the boot down the cable to an appropriate position which will interface with one of the formable collars, e.g. collar 30. Once a first plate (e.g. plate 12) is secured within guides 56 and 58, cables having boots 80 already placed thereon can be positioned within collar portions 30a, 32a by simply laying or placing the cables on the collar portions so that the boot is resting against the collar portion. As should be apparent, collar portions 30a and 32a are shown having different dimensions from each other to accommodate cables having various diameters. It will be appreciated, however, that the collars may, likewise, be fabricated having uniform dimensions as a general matter of design choice and the particular application. It should also be recognized that the cable anchor assembly 10 allows cables to be secured thereto in a simplified manner, relative to prior art arrangements, by placing the cables within the collar portions prior to the collars being assembled, i.e. before the plates are moved together to form collars 30, 32, 34 and 36. This provides an easy installation alternative to the cumbersome current process of having to thread and feed the cables, and especially cables having relatively large diameters and that are consequently difficult to maneuver, through a continuous opening or collar in a conventional mounting assembly.

In a preferred embodiment, an internal surface of the formable collars contains securing protrusions or crimps 76 which apply a squeezing force against a boot and cable when the cable is placed between a pair of collar portions (e.g. 30a, 30b) and the plates are secured together. The crimps 76 further ensure a secure fit between the cable and collar opening. Such crimps may also be located within the fixed collars 76 for providing a snug fit against a cable and boot position therein.

With the cables in place on collar portions 30a, 32a, the plates are then moved along guides 56, 58 in the direction indicated by arrow "A" (FIG. 1) to secure the cables within the resulting collars 30, 32. Once the plates are positioned within guides 56, 58 as shown in FIG. 1 such that plate 14 is disposed between rails 52, 54 and between plates 12 and 16, the plates are secured to each other by operation of a securing means 60 which secures plate 14 to plate 16. An additional securing means (not shown) will also be included for likewise securing plate 14 to plate 12.

Securing means 60 includes in its preferred form an angled bolt 62 having a first end 64 and a second end 68. The first end is pivotally mounted and secured to sleeves 66 formed on rails 52 and 54. Sleeves 66 can be integrally formed with rails 52 and 54 or formed separately and attached thereto, such as by welding, gluing, etc. Each bolt 62 is configured for attachment to a pair of brackets 72 formed on a surface of plate 16 and, specifically, bolts 62 are dimensioned for seating within a channel 74 formed in each bracket 72. Channel 74 has a particular width to accommodate the width of bolt 62, and a length "1" which is, preferably, dimensioned to be shorter than a length "L" of a long portion of bolt 62. After plate 16 is slidably engaged with guides 56, 58 so that collars 34 and 36 are thereby formed, bolts 62 are pivoted within sleeve 66 so that the elongated portions of the bolt seat within the channels 74. Once so positioned, a fastener such as a nut 70 positioned at the second ends 68 of bolts 62 are tightened in a known manner to secure plate 16 to plate 14. Other arrangements for the securing means 60 may be employed and are within the scope and contemplation of the invention.

Figure 3:
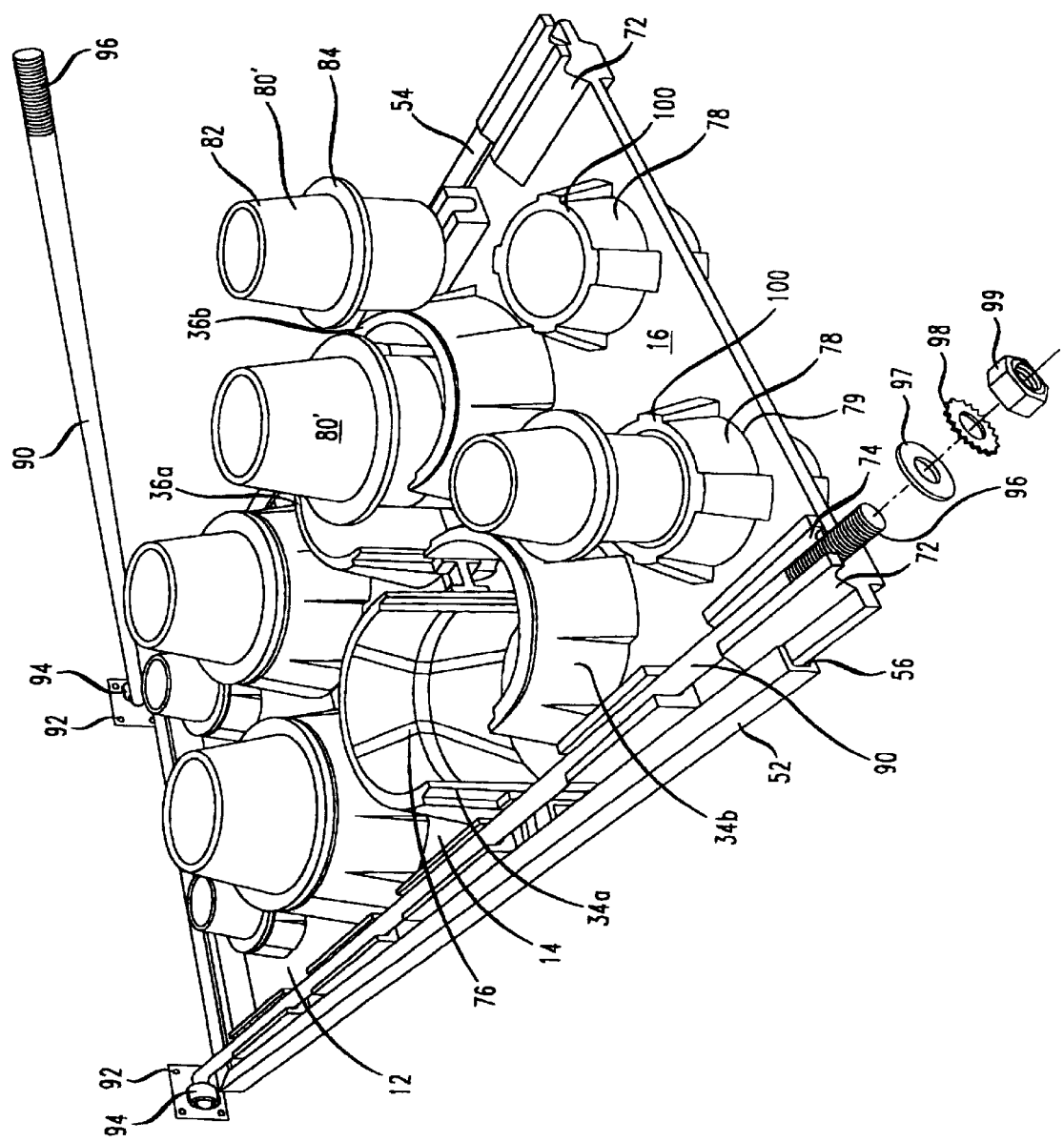
FIG. 3 is a perspective view showing another embodiment of the invention.

For example, and with reference now to FIG. 3, an alternative securing means for securing plates 12, 14 and 16 together in accordance with the present invention is shown. The securing means of FIG. 3 includes a pair of elongated securing bolts 90, each bolt being pivotally mounted at one end to a sleeve 94 formed on a bracket 92 which may be affixed, for example, to a wall of an enclosure housing electrical components such as circuit boards, etc. Like bolts 62, securing bolt 90 is dimensioned to have a width suitable for seating within the channel 74 formed in brackets 72 carried on the surface of each plate 12, 14 and 16. After the plates are slid into close proximity to each other, bolts 90 are lowered and placed within the channel 74. A tightening means such as a washer 97, locking washer 98 and nut 99 are then placed on a threaded end 96 of securing bolts 90 and tightened, as is known in the art, to maintain contact between the plates.

Also shown in FIG. 3 is an alternative form of a boot 80' which, like the boot 80 of FIGS. 1 and 2, is preferably constructed or molded from a durable and flexible weather-resistant material, such as rubber. Boot 80' is used in the same manner set forth above with respect to boot 80 except that it contains a single lip or ridge 84 as contrasted to the two ridges on the boot 80 of FIG. 2. Thus, when boot 80' is placed within fixed collar 78 or within a formable collar (e.g. 34, 36), ridge 84 rests upon an upper surface 100 of the collar.

While there have been shown and described and pointed out fundamental novel features of the invention as applied to preferred embodiments thereof, it will be understood that various omissions and substitutions and changes in the methods described and in the form and details of the devices illustrated, and in their operation, may be made by those skilled in the art without departing from the spirit of the present invention. For example, other boot designs may be envisioned and utilized without departing from the intended scope of the invention. Moreover, although the preferred embodiments disclosed herein contain three plates, the inventive anchor assembly may be constructed with two, or more than three, plates. It is furthermore expressly intended that all combinations of those elements which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A cable anchor assembly, comprising:
   a first plate having a securing edge and an engaging edge, said engaging edge defining a portion of a formable collar;
   a second plate having a securing edge and an engaging edge, said second plate engaging edge defining a remainder of the formable collar;
   a first rail capable of receiving said securing edges of said first and second plates for accommodating slidable relative movement of said plates with respect to each other, said plates being mounted to said first rail so that said engaging edges of said first and second plates form the formable collar and the formable collar defines an opening through the cable anchor assembly when said plates are slid into contact with each other to accommodate placement of a cable between said collar portion and said remainder portion and extending through said opening; and
   means for releasably securing said first and second plates together to retain a cable within said formable collar and extending through said opening, said securing means comprising a groove formed on a surface of each of said first plate and said second plate, a member pivotally connected at one end to one of a fixed surface and said first rail and dimensioned for seating within said groove, and a tightening clip for releasably fastening to a second end of said member.

2. The assembly of claim 1, wherein each of said first and second plates includes a second securing edge opposite said first securing edge of said each plate, said assembly further comprising a second rail spaced from said first rail for receiving, for slidable relative movement, said second securing edges of said first and second plates so that said plates are slidable along and between said first and second rails.

3. The assembly of claim 1, wherein one of said first and second plates has a surface in which a fixed collar opening is defined through said one plate, said fixed collar opening being surrounded by a fixed collar for accommodating passage of a cable through said fixed collar and said fixed collar opening.

4. The assembly of claim 3, wherein said formable collar and said fixed collar each have an inner surface defining a protrusion for engaging a cable positioned through each said collar.

5. The assembly of claim 1, wherein said formable collar has an inner surface defining a protrusion for engaging a cable placed between said formable collar portion and remainder portion and extending through said opening when said first and second plates are secured together.

6. A cable anchor assembly, comprising:
   a first plate having a securing edge and an engaging edge, said engaging edge defining a portion of a formable collar;
   a second plate having a securing edge and an engaging edge, said second plate engaging edge defining a remainder of the formable collar;
   a flexible boot having a longitudinal axis and configured for placement along said longitudinal axis about a cable to be anchored by said assembly, said boot having a first tapered portion, a second tapered portion and a center portion, said first and second tapered portions each having a wide end and a narrow end and oriented relative to said longitudinal axis so that said wide ends are connected to said center portion;
   a first rail configured for receiving said securing edges of said first and second plates for accommodating slidable relative movement of said plates with respect to each other, said plates being mounted to said first rail so that said engaging edges of the first and second plates form the formable collar and the formable collar defines an opening through the cable anchor assembly when said plates are slid into contact with each other to accommodate placement of the cable with said boot placed thereon between said collar portion and said remainder portion with the cable extending through said opening so that said boot interfaces the cable with said formable collar; and
   means for releasably securing said first and second plates together to retain the cable and said boot within said formable collar with the cable extending through said opening.

7. The assembly of claim 6, wherein each of said first and second plates includes a second securing edge opposite said first securing edge of said each plate, said assembly further comprising a second rail spaced from said first rail for receiving, for slidable relative movement, said second securing edges of said first and second plates so that said plates are slidable along and between said first and second rails.

8. The assembly of claim 6, wherein said formable collar has an inner surface defining a protrusion for engaging said boot and the cable placed between said formable collar portion and remainder collar portion when said first and second plates are secured together.

9. The assembly of claim 6, wherein said boot is constructed of a substantially water-resistant material.

10. The assembly of claim 6, wherein said formable collar has an upper surface and wherein said boot further comprises an upper radially protruding ridge disposed between said center portion and said first tapered portion, said upper ridge being seated on said formable collar upper surface when a cable is secured within said formable collar so that said upper ridge seats on said upper surface of said formable collar.

11. The assembly of claim 10, wherein said formable collar has a lower surface and wherein said boot further comprises a lower radially protruding ridge disposed between said center portion and said second tapered portion, said lower ridge being seated on said formable collar lower surface when a cable is secured within said formable collar so that said lower ridge seats on said lower surface of said formable collar.

\* \* \* \* \*